(12) United States Patent
Wagener et al.

(10) Patent No.: US 8,647,456 B2
(45) Date of Patent: Feb. 11, 2014

(54) PROCESS FOR PRODUCTION OF A REINFORCEMENT FOR COMPOSITE MATERIAL WITH A VARIABLE RESISTANCE PROFILE, REINFORCEMENT OBTAINED

(75) Inventors: Gert Wagener, Allemagne (DE); Thierry Klethi, Brangues (FR)

(73) Assignee: Saertex France, Arandon (FR)

( * ) Notice: Subject to any disclaimer, the term of this patent is extended or adjusted under 35 U.S.C. 154(b) by 956 days.

(21) Appl. No.: 11/917,785

(22) PCT Filed: Jun. 15, 2006

(86) PCT No.: PCT/FR2006/001356
§ 371 (c)(1),
(2), (4) Date: Dec. 17, 2007

(87) PCT Pub. No.: WO2006/134271
PCT Pub. Date: Dec. 21, 2006

(65) Prior Publication Data
US 2008/0196820 A1 Aug. 21, 2008

(30) Foreign Application Priority Data
Jun. 15, 2005 (FR) ...................................... 05 51637

(51) Int. Cl.
*B29C 70/16* (2006.01)
*B29C 70/08* (2006.01)

(52) U.S. Cl.
USPC ............ 156/166; 156/169; 156/173; 156/177

(58) Field of Classification Search
USPC .......... 156/169, 177–179, 166, 180, 181, 173
See application file for complete search history.

(56) References Cited

U.S. PATENT DOCUMENTS

| | | | | |
|---|---|---|---|---|
| 4,790,898 A | * | 12/1988 | Woods | 156/166 |
| 4,790,900 A | * | 12/1988 | Guillon et al. | 156/441 |
| 5,895,622 A | | 4/1999 | Ramani et al. | |
| 2004/0241415 A1 | | 12/2004 | Wadahara et al. | |
| 2006/0181061 A1 | * | 8/2006 | Bobrowicz | 280/602 |

FOREIGN PATENT DOCUMENTS

| | | | |
|---|---|---|---|
| DE | 2643783 B1 | * | 3/1978 |
| DE | 2713608 A1 | * | 10/1978 |
| EP | 1 419 875 | | 5/2004 |
| FR | 2 238 000 | | 2/1975 |
| WO | WO-81/00057 A1 | * | 1/1981 |

OTHER PUBLICATIONS

Machine translation of DE 2713608, date unknown.*

* cited by examiner

*Primary Examiner* — Jeff Aftergut
(74) *Attorney, Agent, or Firm* — Young & Thompson

(57) ABSTRACT

The object of the invention is a process for production of a reinforcement (10) for composite material comprising at least two layers (12, 14) intended to be embedded in a polymer matrix, characterized in that at least one (14) of the layers is comprised of continuous filaments (16) in one main direction F and in that these filaments are positioned with variable spacing along this main direction F.

18 Claims, 4 Drawing Sheets

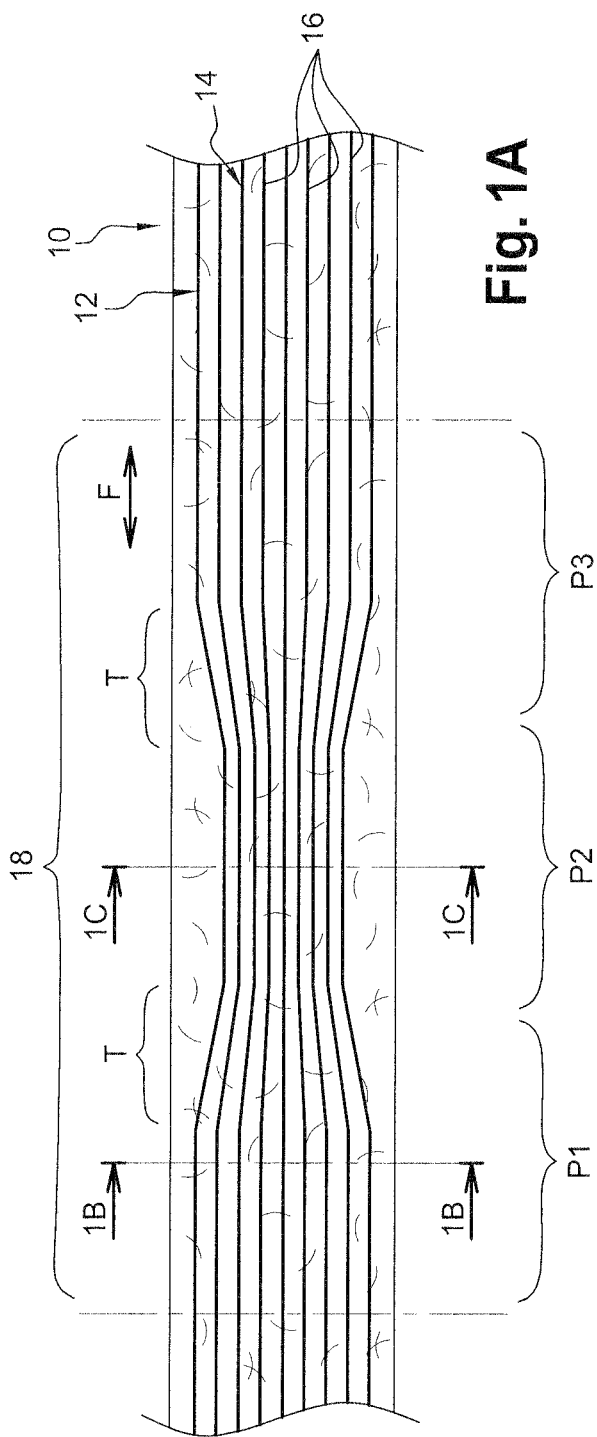
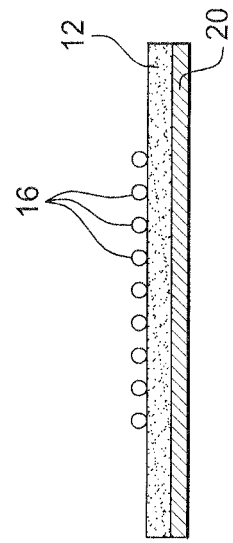
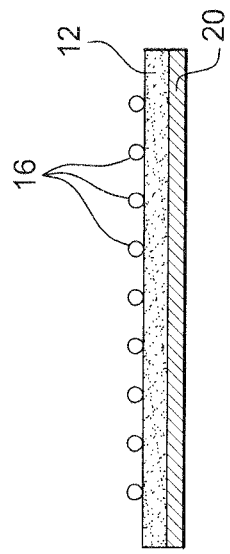
Fig. 1A
Fig. 1B
Fig. 1C

PROCESS FOR PRODUCTION OF A REINFORCEMENT FOR COMPOSITE MATERIAL WITH A VARIABLE RESISTANCE PROFILE, REINFORCEMENT OBTAINED

This invention relates to a process for production of a reinforcement for composite material with a variable resistance profile. The invention also covers the reinforcement obtained and the composite product including at least one reinforcement that is obtained by implementation of the process.

The general principle of composite materials that are used more and more in all fields—products for sports, products in the nautical domain, or vehicles, to cite only some examples—is known.

This general principle consists in including a reinforcement in a polymer matrix.

This reinforcement is used to impart to the composite material what is critical for its mechanical strength. These reinforcements are generally fibers of natural material, but more generally synthetic materials and very commonly glass fibers.

Depending on the diameters of the fibers, their lengths, their nature, depending on the internal arrangements of the layers of woven, non-woven, stitched, glued or bonded fibers, depending on their layouts, the natures of the polymers comprising the matrix, an infinite combination of implementations depending on needs and applications is obtained.

Depending on needs, it may become necessary to reinforce one zone rather than another.

In this case, positioning a reinforcement piece in this zone, if necessary cut depending on the profile of the zone that is superposed on the continuous reinforcement of the piece, is known.

This obviates the necessity of positioning a continuous reinforcement of high resistance on the entire surface, while only one delineated zone requires major resistance.

There is another problem that has not been currently solved and that the process according to this invention proposes to solve.

Actually, one example is the production of a ski or snow board, this being completely illustrative and in no way restrictive as an application; it should generally be noted that there is superposition of the layers of reinforcements embedded in a resin or thermoplastic polymer matrix.

The raw product, once obtained, is cut and then finished.

During the stage of production of the raw board, the reinforcements are superposed and the resistance over the entire length is identical and corresponds at least to the highest necessary resistance, i.e., the most highly stressed zone of said board.

It is possible to position additional layers of reinforcement in the middle of the board in the most highly stressed zone. It is understood that there are several drawbacks to this approach.

First of all, this forms an excess thickness in the zone comprising the reinforcement.

In addition, the board obtained does not have optimum characteristics because the transition from the unreinforced zone to the reinforced zone is not good.

The general strength of the board is likewise disrupted because there is no continuity from one end of the fibers to the other. The progressiveness of deformations under stresses over the length is no longer ensured, and the curvature is no longer uniform.

In economic terms, it should be noted that defects also arise from this. In the case in which the reinforcement is uselessly extended over the entire length, the manufacturer loses not only the unused part of the reinforcement in the finished board, but also the unused reinforcement of the cut part that is considered to be scrap.

The process of the prior art also leads to generating more recycling of the scrap.

The process according to the invention allows these difficulties to be mitigated by suggesting use of continuous fibers in the main direction of stress, but with resistance that has been reinforced in at least one zone by a different distribution.

The invention according to this invention will now be described according to one particular nonrestrictive embodiment, this embodiment being illustrated by one specific nonrestrictive example, said example being the object of the attached drawings that show:

BRIEF DESCRIPTION OF THE DRAWING

FIG. 1A, a top view of a single reinforcement obtained by the process according to this invention.

FIGS. 1B and 1C, two cross-sections of the reinforcement of FIG. 1A along lines 1B-1B and 1C-1C respectively, FIGS. 2A and 2B, two cross-section views of a more complex reinforcement obtained by the same process, following cutting lines that are identical to those of FIG. 1A, FIGS. 3A and 3B, two views of a first pivoting means for allowing implementation of the process to obtain a single reinforcement, FIGS. 3C and 3D, two additional top views to facilitate reading FIGS. 3A and 3B, FIGS. 4A and 4B, two views of a second embodiment with translation for allowing implementation of the process so as to obtain a single reinforcement, FIGS. 5A and 5B, two views of a third embodiment with deployment for allowing implementation of the process so as to obtain a single reinforcement, and FIG. 6, a schematic view illustrating a snow board obtained on the basis of a reinforcement obtained according to the process of the invention.

Figure 2A:
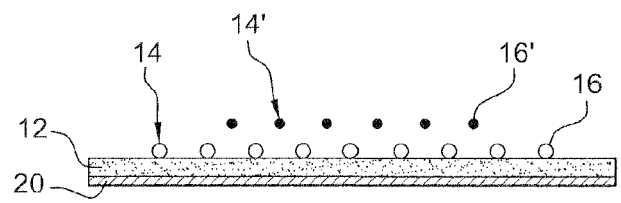

The process according to this invention will now be described in detail first with respect to the figures.

FIG. 1A shows a reinforcement 10 composed of a first, for example non-woven, layer 12 of glass fibers, on the upper surface of which there is a second layer 14.

The second layer 14 is composed of continuous filaments 16 oriented in the longitudinal direction, in this case indicated by the arrow F.

The process runs continuously, and it allows reproduction of modules 18, for example for the production of a snow board.

Each module comprises three main zones P1, P2, and P3, not including the transition zones T.

In the first zone P1, for example, the reinforcement filaments 16 are continuous, positioned parallel to the longitudinal direction F, and spaced apart from one another.

Then, the following primary zone P2 is a zone in which the spacing of the reinforcement filaments 16 is modified, and, if necessary, this spacing is reduced.

Between these two zones, there is a transition zone T, since the filaments are continuous.

At the exit from the central zone P2, in this application to a snow board, there is a transition zone T to arrive at spacings of the reinforcement filaments 16 in zone P3 that are identical to those of zone P1.

In the accepted application, the arrangement has complete symmetry without this having to be considered a prerequisite.

These reinforcement filaments that are intended to be inserted into a base, in this case, the layer 12, must be fixed so that the spacings are maintained until the reinforcement is inserted and embedded in the polymer matrix.

For this purpose, it is possible to use any means of fixing such as gluing or stitching, for example.

The cutaway views show the superposition of the two layers 12 and 14.

It should be noted that in the zone P2 shown in FIG. 1C, the filaments are brought close together. It is understood that the figures are schematic and that according to the products, the filaments are flattened, especially in the case of stitching.

FIG. 1 also show a third layer 20 in the lower part, under the first layer 12 that is a finishing layer, for example a veil.

Figure 6:
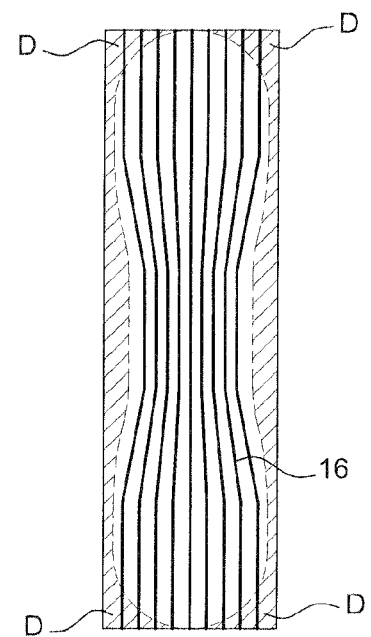

The process leads to obtaining a product that is shown in FIG. 6.

It should be noted that once one or more reinforcements are embedded in a polymer resin and that cross-linking has been obtained, the product is generally ready for cutting.

In this case, it is a snow board, and the cut is shown in a broken line in this FIG. 6.

It is noted that in the central zone P2, the filaments 16 are densified relative to the narrow and thus reduced surface; this yields major resistance in this zone that is mechanically highly stressed and that must have significant rigidity.

In the end zones P1 and P3, the filaments are spaced apart and the density is lower, imparting weaker mechanical strength of this more weakly stressed zone, but greater flexibility; this is a requirement for imparting good qualities to the board.

The transition zones T can be adapted to be gradual with the desired proportionality.

The resistance of the unit is conversely perfectly preserved by the continuity of the reinforcement filaments. This continuity also allows transmission of forces and joining of the different front, middle and rear parts.

It is also noted that the scraps D are optimized and that the reinforcement filaments are used more or less in their entirety. In this embodiment, calculations have shown that there was a savings of 25% of the raw material used.

The weight of the finished product is also optimized since it was not necessary to densify the reinforcement filaments 16 in the end zones, as in the middle zone.

In the transverse direction, the resistance can be improved or modified, but in the known manner by integration of the reinforcement filaments in the transverse direction, in a regular manner, during manufacture of the first layer 12.

The process can be applied to any product in which it is desirable to modify the mechanical strength of a composite material in a given zone, following a given direction.

It is possible to adapt the process to an unlimited number of variants because the nature of the reinforcement filaments, the diameter, the type of reinforcement filaments, the number, the spacings, the lengths, the number of transition zones, and the angularity are just the parameters that can be modified and adjusted.

FIG. 1A shows one simple embodiment, but it is also possible to provide several successive variations that are different over the length of the same reinforcement filaments.

Figure 2B:
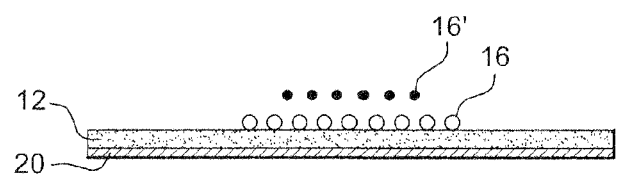

The reinforcement 10 obtained by the process according to the invention can also comprise a succession of layers, and FIGS. 2A and 2B show the superposition of two layers 14 and 14' of reinforcement filaments 16 and 16'.

In this case, it is possible to attain a large number of combinations by involving the diameters, the spacings, the superpositions or not of the more densified zones and all of the other aforementioned parameters.

Manufacture of the reinforcements is done continuously so that the modules such as 18 follow one another.

It is thus necessary to use devices that are suitable for obtaining an exact, repetitive result and that can work at elevated speeds.

A first embodiment is illustrated in FIGS. 3A to 3D.

This device in the known manner comprises a conveyor 22 on which there is positioned a complex composed of the layer 12 and the layer 20, on which the layer 14 that is composed of filaments 16 is to be placed.

Figure 3A:
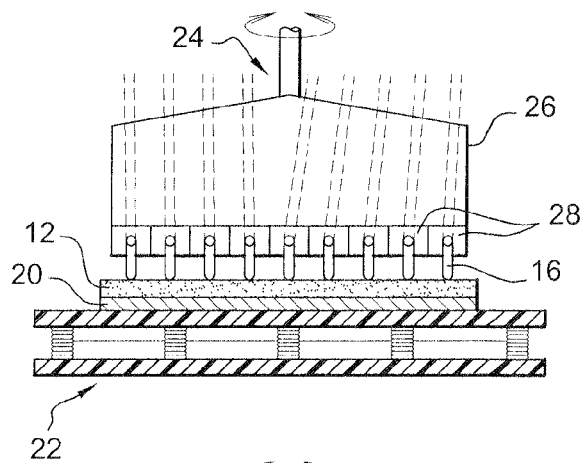

The filaments 16 originating from spools pass through distribution means 24 with variable spacing. These means in the illustrated embodiment comprise a horizontal guide 26 that can assume a position transverse to the longitudinal direction F as shown in FIGS. 3A and 3C, in the direction of unwinding S. This guide 26 comprises passages 28 that are independent of one another.

The number and the spacings between the passages are adapted to the desired base spacings for depositing the filaments of the layer 14 when the guide is perpendicular.

Figure 3B:
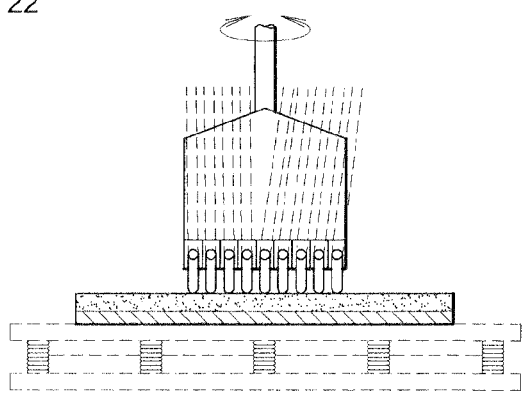
Figure 3C:
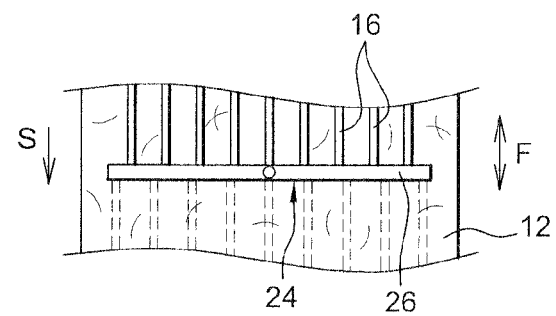
Figure 3D:
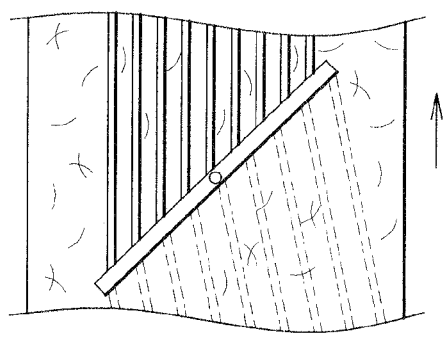

When the spacing must be reduced, as shown in FIGS. 3B and 3D, the guide is oriented to form an incident angle that differs from 90°, all the more remote from 90° as the spacings between the filaments 16 are to be reduced.

The speed of rotation of the guide for a given advance speed in the direction S dictates the profile of the corresponding transition zone T.

One disadvantage in certain productions that this embodiment engenders is that it leads to depositions of filaments shifted to the ends of the transition zones. It is thus possible to tilt the guide to compensate, but this can complicate the arrangement.

Figure 4A:
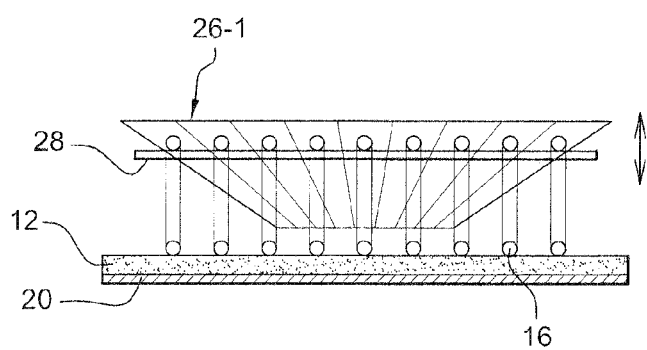
Figure 4B:
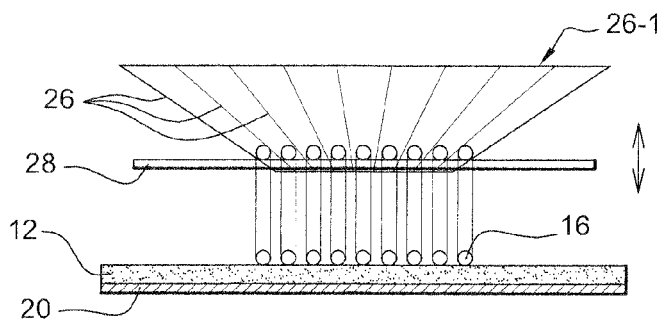

One variant shown in FIGS. 4A and 4B is intended to use a guide 26-1 that comprises spacings with inclined walls, said guide being vertically movable.

The means of delivery of the filaments 16 are connected to said guide.

Thus, when the relative position of the guide 26-1 and retaining means is to be varied, the filaments are housed in the upper or lower part. As the walls are tilted, it is thus possible to vary the spacing between the filaments 16.

The relative movement can be produced either by moving the guide or by moving the delivery means, or both.

Figure 5A:
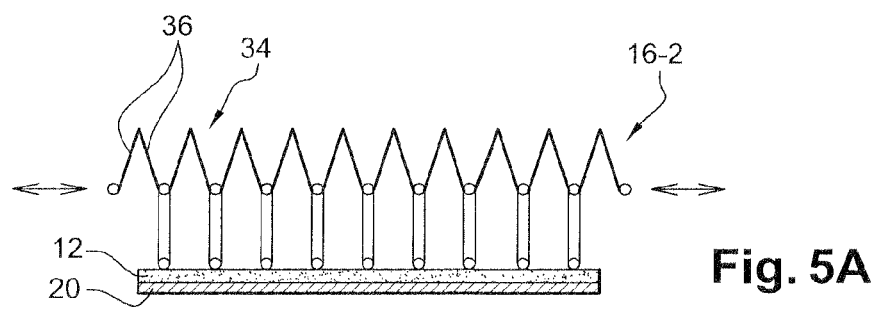
Figure 5B:
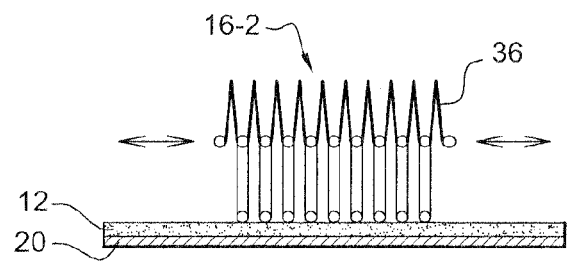

According to another variant, the guide 26-2 is a support 34 with articulated branches 36 that can assume different positions, causing, as shown in FIGS. 5A and 5B, different spacings depending on whether the branches are spaced apart or moved together.

The figures are schematic, and it is possible to provide other variants and especially to position guide pulleys on a support with variable spacings by means of the cam movements.

The invention claimed is:

1. Process for production of snow board modules comprising a continuous process producing plural reinforcement (10) of composite material comprising at least two layers (12, 14) embedded in a polymer matrix, wherein at least one (14) of the layers is comprised of continuous filaments (16) in one main direction (F), wherein said continuous filaments are positioned with variable spacing along the main direction (F), wherein the number of filaments, as measured in a cross section to the one main direction, is constant along the entire one main direction, wherein the filament density of the of the composite is lower in ends zones and higher in a center zone along the one main, and wherein each produced module is a snow board module.

2. Process for production of snow board modules according to claim 1, wherein the filaments (16) of at least one (14) of the layers are made integral with at least one other layer.

3. Process for production of snow board modules according to claim 1, wherein the filaments are made integral by gluing or stitching.

4. Process for production of snow board modules according to claim 1, wherein each module comprises plural layers (14, 14') of said filaments (16, 16') with variable spacings.

5. Process for production of snow board modules according to claim 1, comprising the further steps of using a conveyor (22) on which there is positioned the at least one layer (14) and means (24) of distribution with variable spacing for depositing the layer (14) composed of filaments (16).

6. Process for production of snow board modules according to claim 5, wherein the means (24) of distribution with variable spacing comprise a horizontal guide (26) configured assume a position transverse to the main direction (F), provided with passages (28) that are independent of one another, said guide to assume different angular positions so as to make the spacings between the filaments (16) vary.

7. Process for production of snow board modules according to claim 5, wherein the means (24) of distribution with variable spacing comprise a guide (26-1) that comprises spacings with tilted walls, means of delivery of the filaments (16), said guide and the delivery means being movable relative to one another.

8. Process for production of snow board modules according to claim 5, wherein the means (24) of distribution with variable spacing comprise a support (34) with articulated branches (36) that can assume different positions, causing different spacings depending on whether said branches are spaced apart or moved together.

9. Process for production of a reinforcement (10) according to claim 2, wherein the filaments are made integral by gluing or stitching.

10. Process for production of snow board modules according to claim 2, wherein each module comprises plural layers (14, 14') of said filaments (16, 16') with variable spacings.

11. Process for production of snow board modules according to claim 3, wherein each module comprises plural layers (14, 14') of said filaments (16, 16') with variable spacings.

12. Process for production of snow board modules according to claim 2, comprising the further steps of using a conveyor (22) on which there is positioned the at least one layer (14) and means (24) of distribution with variable spacing for depositing the layer (14) composed of filaments (16).

13. Process for production of snow board modules according to claim 3, comprising the further steps of using a conveyor (22) on which there is positioned the at least one layer (14) and means (24) of distribution with variable spacing for depositing the layer (14) composed of filaments (16).

14. Process for production of snow board modules according to claim 4, comprising the further steps of using a conveyor (22) on which there is positioned the at least one layer (14) and means (24) of distribution with variable spacing for depositing the layer (14) composed of filaments (16).

15. The process of claim 1, wherein,
the method embeds the continuous filaments (16) in the polymer resin and obtains cross-linking,
the process produces snow board modules with plural layers (12, 14) of the continuous filaments (16) running in a longitudinal direction (F), the filaments positioned with variable spacing along the longitudinal direction (F).

16. A process for production of a reinforcement (10) for composite material comprising at least two layers (12, 14) embedded in a polymer matrix, comprising the steps of:
a continuous process embedding continuous filaments (16) in a polymer resin and obtaining cross-linking; and
from the continuous process, providing plural snow board modules (18), each snow board module (18) comprised of plural layers (12, 14) with the continuous filaments (16) running in a longitudinal direction (F), the filaments positioned with variable spacing along the longitudinal direction (F),
wherein the number of filaments, as measured in a cross section to the one main direction, is constant along the entire one main direction, and
wherein the filament density of the of the composite is lower in ends zones and higher in a center zone along the one main direction.

17. The process of claim 16, wherein,
each module comprises three zones (P1, P2, P3),
in a first zone (P1) of the three zones the filaments (16) are spaced apart from one another in a first spacing distance,
in a second zone (P2) of the three zones the filaments (16) are spaced apart from one another in a second spacing distance smaller than the first spacing distance,
in a third zone (P3) of the three zones the filaments (16) are spaced apart from one another in a third spacing distance greater than the second spacing distance,
the second zone being located between the first and third zones, and
the filaments are continuous from the first zone through the second zone and through the third zone,
the density of the first and third zones being less than the density of the second zone.

18. The process of claim 17, wherein,
each module further comprises i) a first transition zone (T) between the first and second zones three zones and ii) a second transition zone (T) between the second and third zone, and
in the first transition zone (T) the spacing of the filaments (16) is reducing from the first spacing distance to the second spacing distance, and
in the second transition zone (T) the spacing of the filaments (16) is increased from the second spacing distance to the third spacing distance.

* * * * *

UNITED STATES PATENT AND TRADEMARK OFFICE
CERTIFICATE OF CORRECTION

PATENT NO.       : 8,647,456 B2                                                     Page 1 of 1
APPLICATION NO.  : 11/917785
DATED            : February 11, 2014
INVENTOR(S)      : Wagener et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 848 days.

Signed and Sealed this

Twenty-ninth Day of September, 2015

Michelle K. Lee
*Director of the United States Patent and Trademark Office*